(12) United States Patent
Chung et al.

(10) Patent No.: US 11,749,014 B2
(45) Date of Patent: Sep. 5, 2023

(54) OPTICAL FINGERPRINT SENSING APPARATUS, DRIVER APPARATUS THEREOF AND OPERATION METHOD

(71) Applicant: Novatek Microelectronics Corp., Hsinchu (TW)

(72) Inventors: Jung-Chen Chung, Hsinchu County (TW); Chi-Ting Chen, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 17/394,329

(22) Filed: Aug. 4, 2021

(65) Prior Publication Data

US 2022/0050993 A1 Feb. 17, 2022

Related U.S. Application Data

(60) Provisional application No. 63/064,935, filed on Aug. 13, 2020.

(51) Int. Cl.
*G06V 40/13* (2022.01)
*G06F 3/042* (2006.01)
*G06F 3/041* (2006.01)

(52) U.S. Cl.
CPC ........ *G06V 40/1318* (2022.01); *G06F 3/0412* (2013.01); *G06F 3/0421* (2013.01)

(58) Field of Classification Search
CPC .. G06V 40/1318; G06V 40/12; G06F 3/0412; G06F 3/0421
See application file for complete search history.

(56) References Cited

U.S. PATENT DOCUMENTS

| | | | | |
|---|---|---|---|---|
| 2015/0021627 A1* | 1/2015 | Fujita | ...................... | H01L 31/18 257/82 |
| 2015/0309662 A1* | 10/2015 | Wyrwas | ................ | G06F 3/0425 345/175 |
| 2017/0337413 A1* | 11/2017 | Bhat | .................. | G06V 40/1318 |
| 2020/0034597 A1* | 1/2020 | He | ...................... | G02F 1/13338 |
| 2020/0387688 A1* | 12/2020 | Park | .................... | G06V 40/1335 |
| 2020/0410200 A1* | 12/2020 | Davis | .................... | G06V 10/141 |

* cited by examiner

*Primary Examiner* — Roberto W Flores
(74) *Attorney, Agent, or Firm* — JCIPRNET (57) ABSTRACT

An optical fingerprint sensing apparatus, a driver apparatus, and an operation method are provided. The driver apparatus includes a display driving device and a fingerprint sensing driving device. The display driving device drives the display panel to display different frames with different luminances, and the different frames are used to generate at least one of different transmitted light intensities and different reflected light intensities. The fingerprint sensing driving device drives the display panel to perform a fingerprint capturing operation to capture a plurality of different fingerprint images of a finger under the at least one of the different transmitted light intensities and the different reflected light intensities. The different fingerprint images are processed to generate a processed fingerprint image.

31 Claims, 6 Drawing Sheets

FIG. 4 driving a display panel to display different frames, wherein the different frames are used to generate at least one of different transmitted light intensities and different reflected light intensities —S510 driving the display panel to perform a fingerprint capturing operation to capture a plurality of different fingerprint images of a finger under the different transmitted light intensities and/or the different reflected light intensities —S520 processing the different fingerprint images to generate a processed fingerprint image —S530

OPTICAL FINGERPRINT SENSING APPARATUS, DRIVER APPARATUS THEREOF AND OPERATION METHOD

CROSS-REFERENCE TO RELATED APPLICATION

This application claims the priority benefit of U.S. application Ser. No. 63/064,935, filed on Aug. 13, 2020. The entirety of the above-mentioned patent application is hereby incorporated by reference herein and made a part of this specification.

BACKGROUND

Technical Field

The disclosure relates to a fingerprint sensing apparatus, and in particular, relates to an optical fingerprint sensing apparatus, a driver apparatus, and an operation method.

Description of Related Art

In recent years, the full-screen (or large-screen) optical fingerprint sensing technology is adopted by the optical fingerprint sensing apparatuses. A user may press a finger anywhere on a display panel for optical fingerprint sensing. When a fingerprint image is captured, the display panel may display a speckle to supply a light source (incident light) to the finger of the user. The reflected light of the finger may be sensed by the display panel. Generally, in a fingerprint, the luminance of the reflected light of the ridges is greater than the luminance of the reflected light of the valleys. Therefore, the display panel may capture the fingerprint image. However, ambient light may affect the fingerprint sensing of an optical fingerprint sensing apparatus. Generally, the stronger the ambient light, the more likely the fingerprint recognition may fail.

For instance, when optical fingerprint sensing is performed in strong ambient light, the strong ambient light may penetrate the finger and may be sensed by the display panel. In this case, the fingerprint sensing result of the display panel includes the reflected light component and the transmissive light component. The reflected light component is the sensing target. The reflected light component is generated after the speckle displayed by the display panel hits the finger. Generally, regarding the reflected light component, in a fingerprint, the luminance of the ridges is greater than the luminance of the valleys. The transmissive light component is generated by the strong ambient light penetrating the finger. Generally, regarding the transmissive light component, in a fingerprint, the luminance of the ridges is less than the luminance of the valleys. The transmissive light component may interfere (affect) the reflected light component. Therefore, strong ambient light can easily cause a fingerprint signal to drift (abnormal), which in turn causes a subsequent circuit to be unable to analyze the fingerprint signal.

SUMMARY

The disclosure provides an optical fingerprint sensing apparatus, a driver apparatus, and an operation method to lower a negative effect of ambient light on fingerprint sensing.

In an embodiment of the disclosure, the driver apparatus includes a display driving device and a fingerprint sensing driving device. The display driving device is coupled to a display panel. The display driving device is configured to drive the display panel to display different frames with different luminances, and the different frames are used to generate at least one of different transmitted light intensities and different reflected light intensities. The fingerprint sensing driving device is coupled to the display panel. The fingerprint sensing driving device is configured to drive the display panel to perform a fingerprint capturing operation to capture a plurality of different fingerprint images of a finger under the at least one of the different transmitted light intensities and the different reflected light intensities. The different fingerprint images are processed to generate a processed fingerprint image.

In an embodiment of the disclosure, the optical fingerprint sensing apparatus includes a display panel and a driver apparatus. The display panel is configured to perform a fingerprint capturing operation on a finger when the finger contacts the display panel. The driver apparatus includes a display driving device and a fingerprint sensing driving device. The display driving device is coupled to the display panel. The display driving device is configured to drive the display panel to display different frames with different luminances, and the different frames are used to generate at least one of different transmitted light intensities and different reflected light intensities. The fingerprint sensing driving device is configured to be coupled to the display panel to drive the display panel to perform a fingerprint capturing operation. The fingerprint sensing driving device is configured to capture a plurality of different fingerprint images of a finger under the at least one of the different transmitted light intensities and the different reflected light intensities. The different fingerprint images are processed to generate a processed fingerprint image.

In an embodiment of the disclosure, the operation method includes the following steps. A display panel is driven to display different frames when a finger contacts the display panel. The different frames are used to generate at least one of different transmitted light intensities and different reflected light intensities. The display panel is driven to perform a fingerprint capturing operation to capture a plurality of different fingerprint images of the finger under the at least one of the different transmitted light intensities and the different reflected light intensities. The different fingerprint images are processed to generate a processed fingerprint image.

To sum up, in the embodiments of the disclosure, the fingerprint sensing driving device may capture a plurality of different fingerprint images of the same finger under the different transmitted light intensities and/or the different reflected light intensities. The optical fingerprint sensing apparatus may process these different fingerprint images to generate one processed fingerprint image to lower the negative effect of ambient light on fingerprint sensing.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

The term "coupled to (or connected to)" used in the entire disclosure (including claims) refers to any direct or indirect connecting means. For example, if the disclosure describes a first apparatus is coupled to (or connected to) a second apparatus, the description should be explained as the first apparatus that is connected directly to the second apparatus, or the first apparatus, through connecting other apparatus or using certain connecting means, is connected indirectly to the second apparatus. In addition, terms such as "first" and "second" in the entire specification (including claims) are used only to name the elements or to distinguish different embodiments or scopes and should not be construed as the upper limit or lower limit of the number of any element and should not be construed to limit the order of the elements.

Moreover, elements/components/steps with the same reference numerals represent the same or similar parts in the figures and embodiments where appropriate. Descriptions of the elements/components/steps with the same reference numerals or terms in different embodiments may be references for one another.

In the following, a number of embodiments are used to illustrate a number of solutions for recognizing a fingerprint in strong ambient light. In some embodiments, a driver apparatus may perform optical fingerprint sensing for a number of times on the same fingerprint through a display panel, so as to obtain a plurality of fingerprint images, and uses these fingerprint images to reduce transmissive light components generated by ambient light, so that fingerprint signal drifting may be prevented from occurring as much as possible.

Figure 1:
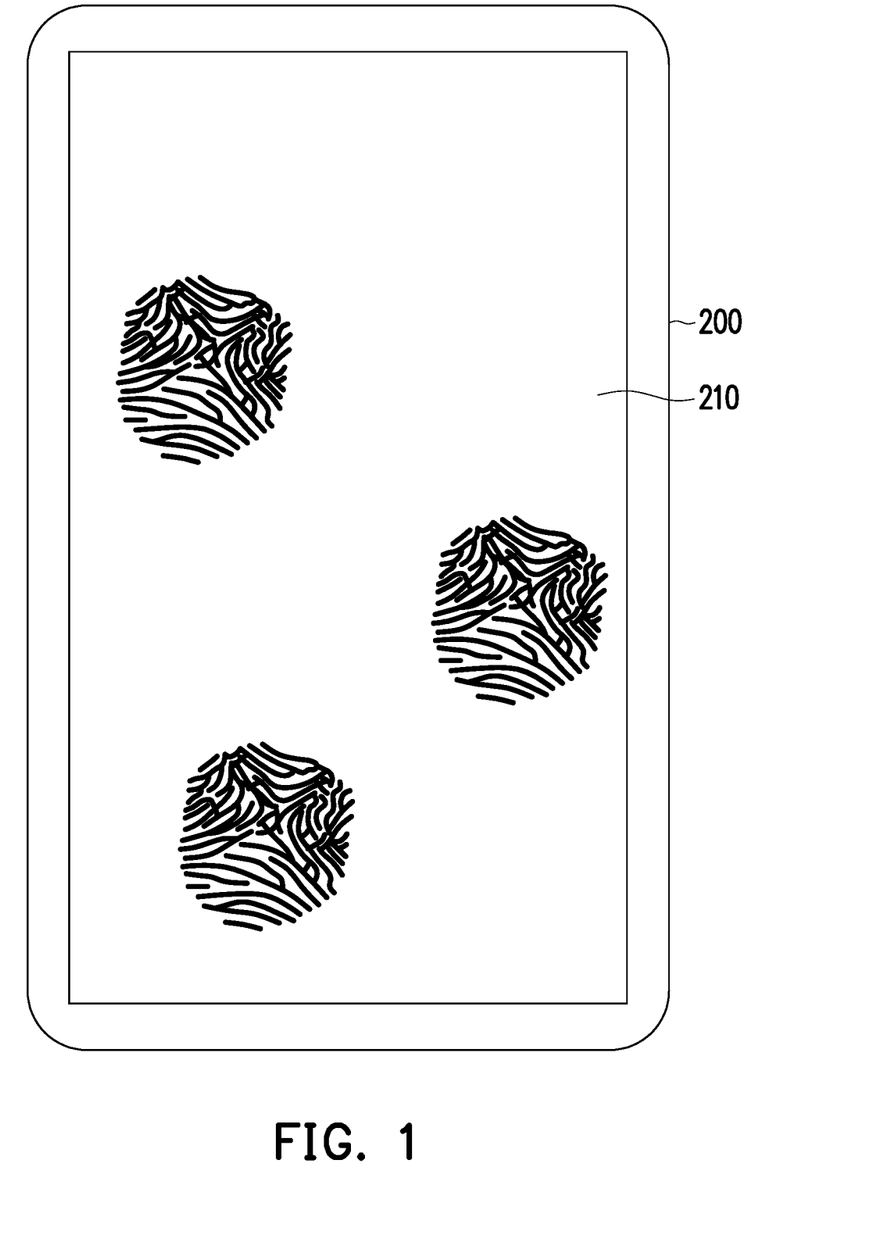
FIG. 1 is a schematic view of an operation scenario of an optical fingerprint sensing apparatus.
Figure 2:
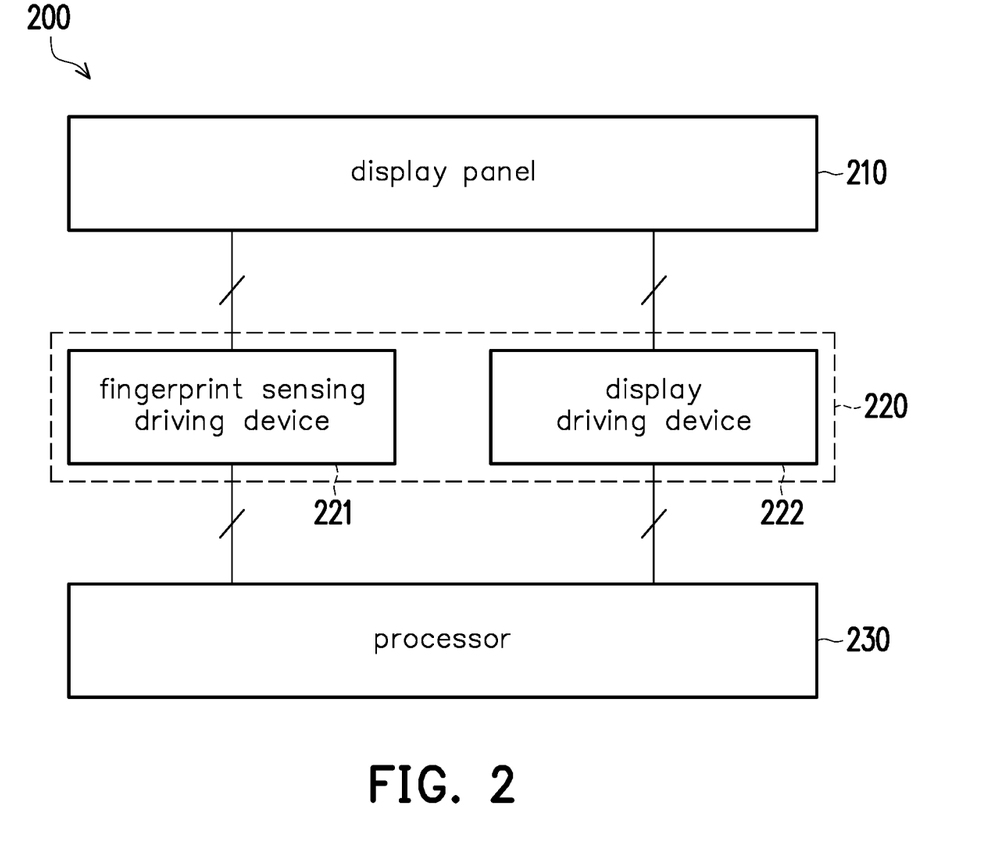
FIG. 2 is a schematic diagram of circuit blocks of the optical fingerprint sensing apparatus according to an embodiment of the disclosure.

FIG. 1 is a schematic view of an operation scenario of an optical fingerprint sensing apparatus 200. FIG. 2 is a schematic diagram of circuit blocks of the optical fingerprint sensing apparatus 200 according to an embodiment of the disclosure. As shown in FIG. 1 and FIG. 2, the optical fingerprint sensing apparatus 200 includes a display panel 210 and a driver apparatus 220. When a finger touches a touch region of the display panel 210, the display panel 210 may perform a fingerprint capturing operation on a fingerprint sensing region corresponding to the touch region. Implementation details of the display panel 210 are not limited by this embodiment. For instance, the display panel 210 may be a conventional display panel or a display panel exhibiting a fingerprint sensing function. According to different design needs, the driver apparatus 220 may be implemented in a form of hardware, firmware, software (i.e., a program), or a combination of the majority of the foregoing three.

In the form of hardware, the driver apparatus 220 may be implemented in the form of a logic circuit on an integrated circuit. Related functions of the driver apparatus 220 may be implemented as hardware through using hardware description languages (e.g., Verilog HDL or VHDL) or other suitable programming languages. For instance, the related functions of the driver apparatus 220 may be implemented in one or a plurality of controllers, a micro controller, a micro processor, an application-specific integrated circuit (ASIC), a digital signal processor (DSP), a field programmable gate array (FPGA), and/or various logic blocks, modules, and circuits in other processing units.

In the form of software and/or firmware, the related functions of the driver apparatus 220 may be implemented as programming codes. For instance, the driver apparatus 220 may be implemented by using a general programming language (e.g., C, C++, or an assembly language) or other suitable programming languages. The programming codes may be recorded/stored in a "non-transitory computer readable medium". In some embodiments, the non-transitory computer readable medium includes, for example, a ready only memory (ROM), a tape, a disk, a card, a semiconductor memory, a programmable logic circuit, and/or a storage device. The storage device includes a hard disk drive (HDD) a solid-state drive (SSD), or other storage devices. A central processing unit (CPU), a controller, a micro controller, or a micro processor may read and execute the programming codes from the recording medium to accomplish the related functions of the driver apparatus 220.

The driver apparatus 220 includes a fingerprint sensing driving device 221 and a display driving device 222. The display driving device 222 is coupled to the display panel 210. The display driving device 222 may drive the display panel 210 to display different frames with different luminances. The different frames are used to generate different transmitted light intensities and/or different reflected light intensities. Implementation details of the display driving device 222 are not limited herein. According to actual design, in some embodiments, the display driving device 222 may include a conventional display driving circuit or other display driving circuits. For instance, in some other embodiments, the display driving device 222 may include a timing controller, source driver, and a gate driver (none of which is shown in FIG. 2).

The fingerprint sensing driving device 221 is coupled to the display panel 210. The fingerprint sensing driving device 221 may drive the display panel 210 to perform the fingerprint capturing operation on the finger to capture (obtain) a fingerprint image of the finger. Based on the display driving performed by the display driving device 222 on the display panel 210, the fingerprint sensing driving device 221 may capture a plurality of different fingerprint images of the same finger under different transmitted light intensities and/or different reflected light intensities, and then provides/transmits these fingerprint images to a processor 230. The processor 230 may process the different fingerprint images to generate a processed fingerprint image to lower a negative effect of ambient light on fingerprint sensing. The processor 230 may use the processed fingerprint image to perform fingerprint recognition.

Figure 3:
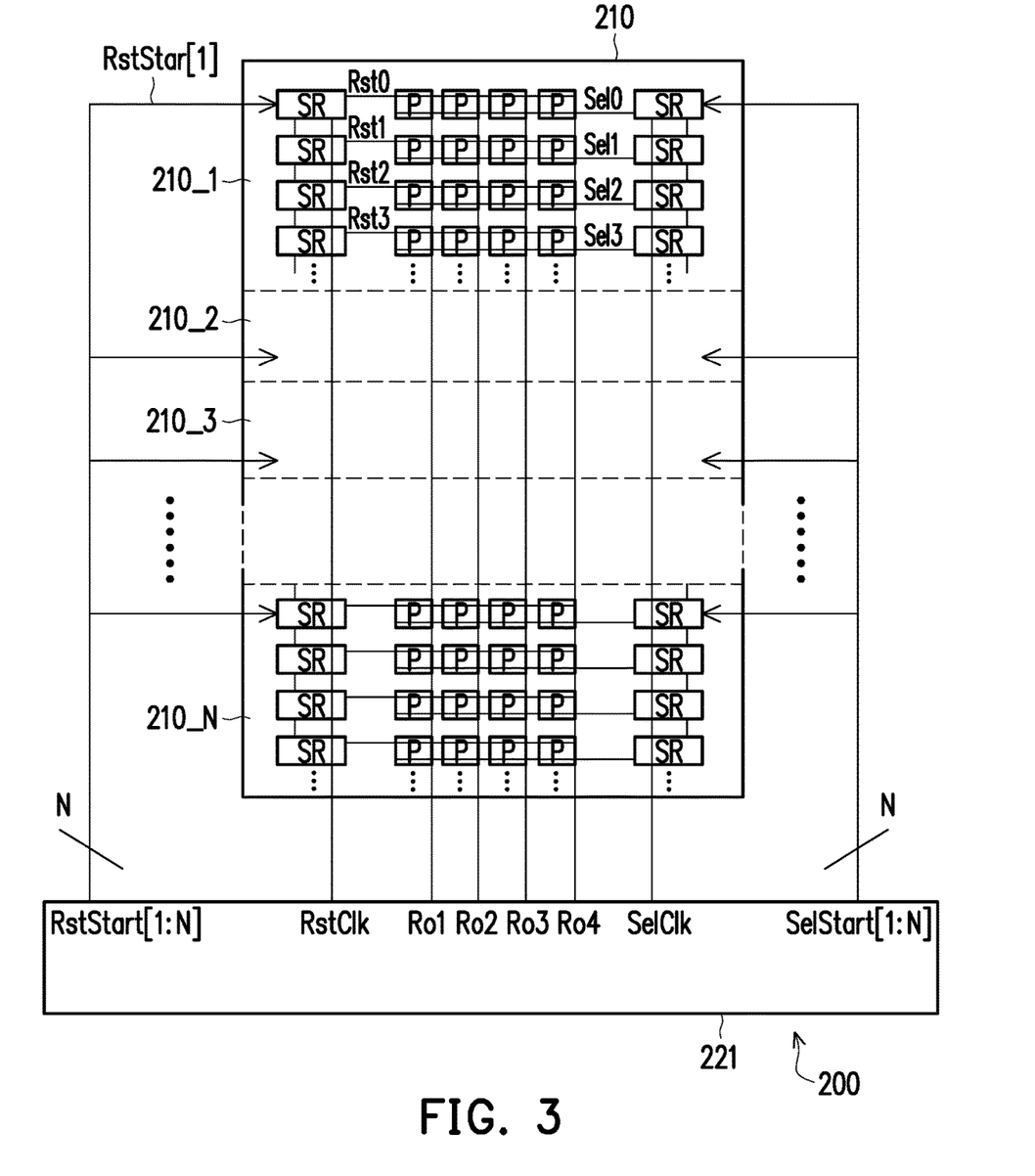
FIG. 3 is a schematic diagram illustrating circuit blocks of a display panel and a fingerprint sensing driving device shown in FIG. 2 according to an embodiment of the disclosure.

FIG. 3 is a schematic diagram illustrating circuit blocks of the display panel 210 and the fingerprint sensing driving device 221 shown in FIG. 2 according to an embodiment of the disclosure. With reference to FIG. 1 and FIG. 3, an optical sensing pixel array of the display panel 210 includes a plurality of optical sensing pixels P. Implementation details of the optical sensing pixels P are not limited by this embodiment. According to actual design, in some embodiments, the optical sensing pixels P may be conventional optical sensing pixels or other optical sensing pixels. One or more fingers of a user may press on the display panel 210 of the optical fingerprint sensing apparatus 200. The optical sensing pixel array of the display panel 210 may sense a fingerprint/fingerprints of this finger/these fingers. As such, when the finger contacts the display panel 210, the display panel 210 may perform the fingerprint capturing operation on the finger. The fingerprint sensing driving device 221 is coupled to the display panel 210. The fingerprint sensing driving device 221 may drive the display panel 210 to perform the fingerprint capturing operation on the finger to capture (obtain) the fingerprint image of the finger.

In the embodiment shown in FIG. 2, the display panel 210 may be divided into N sub regions 210_1, 210_2, 210_3, ..., and 210_N, where N is an integer which is determined according to actual design. Shift registers SR may be disposed on the display panel 210. The fingerprint sensing driving device 221 may output one reset clock RstClk and N reset start pulses RstStart[1:N] to some shift registers SR (as shown in FIG. 3). According to timings of the reset clock RstClk and the reset start pulses RstStart[1:N], some shift registers SR may output scanning signals to scan these optical sensing pixels P of the optical sensing pixel array of the display panel 210.

Figure 4:
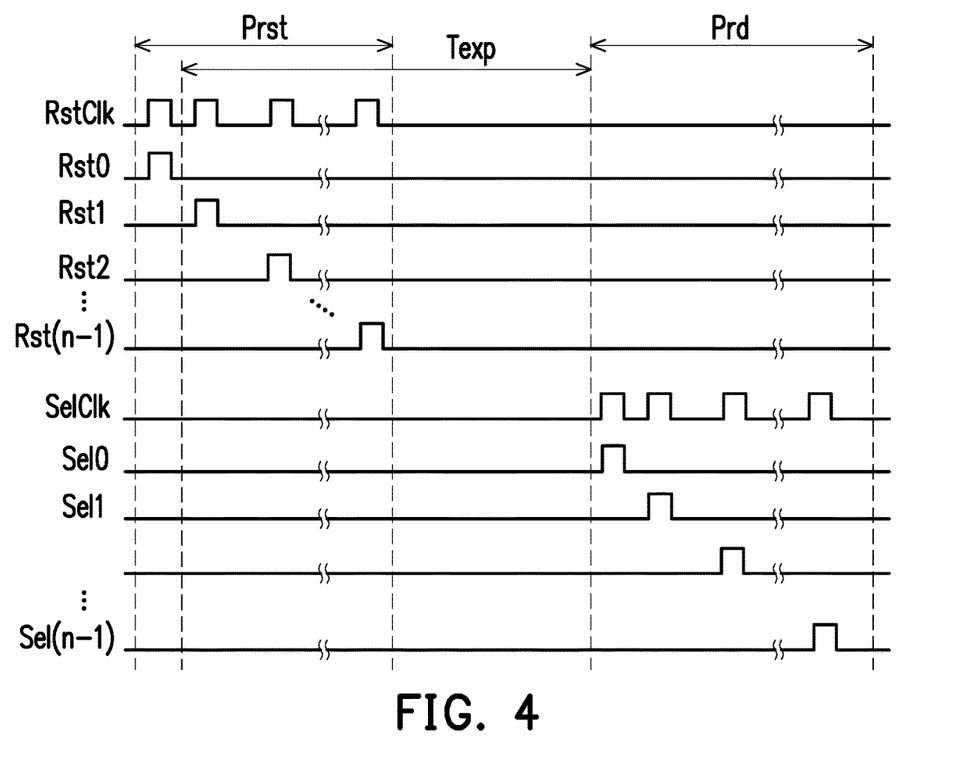
FIG. 4 is a schematic diagram illustrating timings of signals shown in FIG. 3 according to an embodiment of the disclosure.

For instance, FIG. 4 is a schematic diagram illustrating timings of signals shown in FIG. 3 according to an embodiment of the disclosure. With reference to FIG. 3 and FIG. 4, according to the timings of the reset clock RstClk and the reset start pulse RstStart[1], the shift registers SR in the sub region 210_1 may output n reset scanning signals Rst0, Rst1, Rst2, Rst3, ..., and Rst(n−1), where n is an integer which is determined according to actual design. Description of other sub regions 210_2 to 210_N may be deduced by analogy with reference to the related description of the sub region 210_1 and thus is not repeated herein. According to the scanning timings of the reset scanning signals Rst0 to Rst(n−1), the optical sensing pixel array in the sub region 210_1 of the display panel 210 may perform one complete reset scanning operation. A period during which the optical sensing pixel array performs one complete reset scanning operation may be referred to as a fingerprint frame reset period Prst.

The fingerprint sensing driving device 221 may output one read clock (selection clock) SelClk and N selection start pulses SelStart[1:N] to some other shift registers SR (as shown in FIG. 3). According to timings of the read clock SelClk and the selection start pulses SelStart[1:N], these shift registers SR may output read scanning signals to scan these optical sensing pixels P of the optical sensing pixel array of the display panel 210. For instance, according to the timings of the read clock SelClk and the selection start pulses SelStart[1:N], these shift registers SR in the sub region 210_1 may output read scanning signals Sel0, Sel1, Sel2, Sel3, ..., and Sel(n−1) to scan these optical sensing pixels P of the optical sensing pixel array of the display panel 210. Based on scanning timings of the read scanning signals Sel0 to Sel(n−1), the fingerprint sensing driving device 221 may sense (read) optical sensing results of these optical sensing pixels P through source lines (sensing lines) Ro1, Ro2, Ro3, and Ro4 of the display panel 210. A period during which the optical sensing pixel array performs one complete read scanning operation may be referred to as a fingerprint frame reading period Prd.

For the optical sensing pixels P of a first row shown in FIG. 3, a period from a pulse of the reset scanning signal Rst0 (the optical sensing pixels P of the first row are reset) to a pulse of the read scanning signal Sel0 (the optical sensing pixels P of the first row are read) is an exposure time Texp of the optical sensing pixels P of the first row. The fingerprint sensing driving device 221 may dynamically adjust the exposure time Texp according to ambient light. The fingerprint sensing driving device 221 may shorten the exposure time Texp as much as possible and may even set the fingerprint frame reading period Prd to partially overlap the fingerprint frame reset period Prst in time. After the fingerprint frame reset period Prst and the fingerprint frame reading period Prd are completed, the fingerprint sensing driving device 221 may capture one fingerprint image of the finger.

Figure 5:
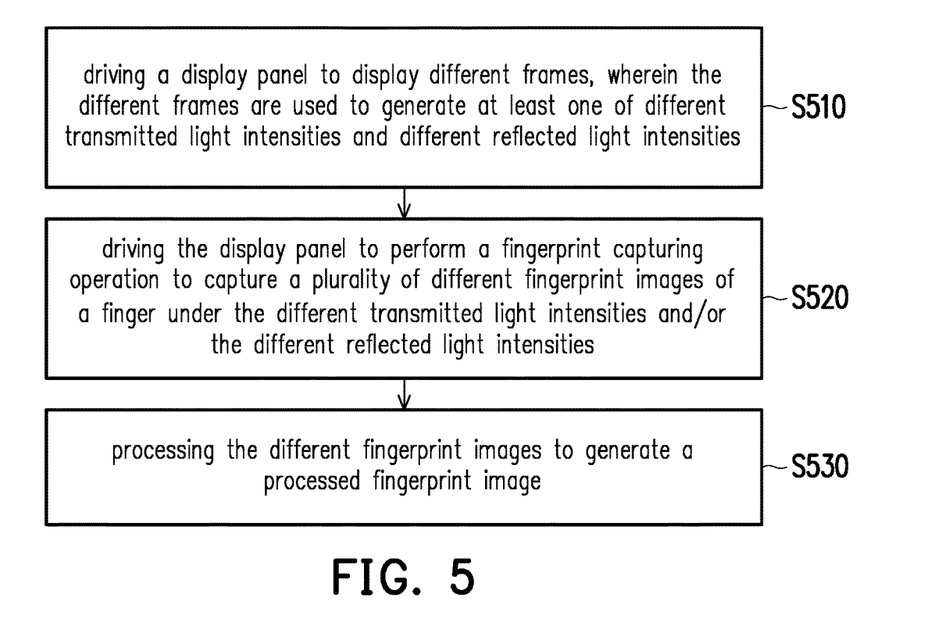
FIG. 5 is a schematic flow chart of an operation method of the optical fingerprint sensing apparatus according to an embodiment of the disclosure.

FIG. 5 is a schematic flow chart of an operation method of the optical fingerprint sensing apparatus according to an embodiment of the disclosure. With reference to FIG. 2 and FIG. 5, when the finger contacts the display panel 210, in step S510, the display driving device 222 controlled by the processor 230 may drive the display panel 210 to generate/display different frames. The different frames are used to generate at least one of different transmitted light intensities and different reflected light intensities. According to actual design, in some embodiments, the different frames have at least one of characteristics including shape, area, global luminance, local luminance, and quantity, to produce the different transmitted light intensities and/or the different reflected light intensities.

In step S520, the fingerprint sensing driving device 221 may drive the display panel 210 to perform a fingerprint capturing operation to capture a plurality of different fingerprint images of the same finger under the different transmitted light intensities and/or the different reflected light intensities. Based on the display driving performed by the display driving device 222 on the display panel 210, the fingerprint sensing driving device 221 may capture a plurality of different fingerprint images of the same finger under different transmitted light intensities and/or different reflected light intensities, and then provides/transmits these fingerprint images to the processor 230.

In step S530, the processor 230 may process the different fingerprint images to generated a processed fingerprint image to lower a negative effect of ambient light on the processed fingerprint image. Any one of the different fingerprint images includes a reflected light component contributed by the different frames displayed by the display panel 210 and a transmissive light component contributed by ambient light. The different frames displayed by the display panel 2110 are used to generate different intensities of the reflected light component of the different fingerprint images. After obtaining the fingerprint images having different reflected light components, the processor 230 may set these fingerprint images to perform a subtraction operation to generate the processed fingerprint image, so as to lower the negative effect of the ambient light on the processed fingerprint image. The processor 230 may use the processed fingerprint image to perform fingerprint recognition.

For instance (but not limited thereto), a touch driving device (not shown) may detect a touch position of the finger on the display panel 210, and then the touch driving device may report information related to the touch position to the processor 230. In some embodiments, according to the touch position, the processor 230 may add a speckle pattern into an image frame, and then transmits the image frame added with the speckle pattern to the display driving device 222. Alternatively, in some other embodiments, the processor 230 may provide the touch position and the image frame to the display driving device 222, and the display driving device 222 may then add the speckle pattern into the image frame according to the touch position. The display driving device 222 may drive the display panel 210 to display the image frame (a plurality of image frames with different luminances) added with the speckle pattern. When the display panel 210 displays the image frames with different luminances, the fingerprint sensing driving device 221 may capture a plurality of fingerprint images and provides these fingerprint images to the processor 230. The processor 230 may process these fingerprint images to generate the processed fingerprint image, so as to set the processed fingerprint image to perform fingerprint recognition.

For instance, the user may press a finger anywhere on the display panel 210 for optical fingerprint sensing. When a fingerprint image is captured, the display panel 210 may display a predetermined frame (e.g., a speckle) to supply a light source (incident light) to the finger of the user. The optical sensing pixel array of the display panel 210 may sense reflected light of the finger to capture the fingerprint image. Generally, in a fingerprint, the luminance of the reflected light of the ridges is greater than the luminance of the reflected light of the valleys. Regarding normal ambient light, it is difficult for the ambient light to penetrate the finger, or the ambient light penetrating the finger is considerably weak (the optical sensing pixel array of the display panel 210 cannot perform sensing). In this case, a fingerprint sensing result (a fingerprint image A) of the display panel 210 includes a reflected light component RV, as shown in formula 1 below. The reflected light component RV is related to the reflected light which is generated after a light frame of the display panel 210 hits the finger.

$$\text{fingerprint image } A = RV \qquad \text{formula 1}$$

When the display panel 210 performs optical fingerprint sensing in strong ambient light, the strong ambient light may penetrate the finger and may be sensed by the optical sensing pixel array of the display panel 210. The display panel 210 may display the predetermined frame (e.g., the speckle) to supply a light source (incident light) to the finger, and the strong ambient light penetrates the finger at the same time and reaches the display panel 210. In this case, the fingerprint sensing result (a fingerprint image B) of the display panel 210 includes the reflected light component RV and a transmissive light component $-RV2$, as shown in formula 2 below. The reflected light component RV is related to the reflected light which is generated after light of the display panel 210 hits the finger. Regarding the reflected light component RV, in a fingerprint, the luminance of the ridges is greater than the luminance of the valleys. The reflected light component RV is a sensing target.

$$\text{fingerprint image } B = RV + (-RV2) \qquad \text{formula 2}$$

The transmissive light component $-RV2$ in formula 2 is generated by the strong ambient light penetrating the finger. Regarding the transmissive light component $-RV2$, in a fingerprint, the luminance of the ridges is less than the luminance of the valleys. An image property of the transmissive light component $-RV2$ is opposite to an image property of the reflected light component RV. In other words, the transmissive light component $-RV2$ may interfere (affect) the reflected light component RV. Therefore, strong ambient light can easily cause a fingerprint signal to drift (abnormal), which in turn causes a subsequent circuit to be unable to analyze the fingerprint signal. In the following, several embodiments are used to illustrate how to reduce the transmissive light component $-RV2$ generated by the ambient light in strong ambient light, so as to prevent fingerprint signal drifting from occurring as much as possible.

In an environment of pure strong ambient light (the display panel 210 does not provide the light frame), the fingerprint sensing result (a fingerprint image C) of the display panel 210 includes the transmissive light component $-RV2$, as shown in formula 3 below. Because the display panel 210 does not provide the light frame to illuminate the finger, there is no reflected light from the finger (or the reflected light is excessively weak).

$$\text{fingerprint image } C = (-RV2) \qquad \text{formula 3}$$

Implementation of the "capturing a plurality of fingerprint images under different luminances (or different ambient light luminances) of different frames and using these fingerprint images to reduce the negative effect of the transmissive light component $-RV2$" is described in this embodiment. For instance, the processor 230 may subtract the fingerprint image C (the frame displayed by the display panel 210 has low luminance, or the luminance of the frame is 0) from the fingerprint image B (the frame displayed by the display panel 210 has high luminance) to generate the processed fingerprint image, as shown in formula 4 below. Therefore, the transmissive light component $-RV2$ of the processed fingerprint image may be effectively removed.

$$\begin{aligned}\text{processed fingerprint image} &= \text{fingerprint image } B - \\ &\quad \text{fingerprint image } C \\ &= RV + (-RV2) - (-RV2) = RV\end{aligned} \qquad \text{formula 4}$$

For instance, the processor 230 may subtract the fingerprint image C (the frame displayed by the display panel 210 has low luminance, or the luminance of the frame is 0) from the fingerprint image A (the frame displayed by the display panel 210 has high luminance) to generate the processed fingerprint image, as shown in formula 5 below. Therefore, a luminance difference between the ridges and valleys in the reflected light component RV may be increased.

$$\begin{aligned}\text{processed fingerprint image} &= \text{fingerprint image } A - \\ &\quad \text{fingerprint image } C \\ &= RV - (-RV2)\end{aligned} \qquad \text{formula 5}$$

Figure 6:
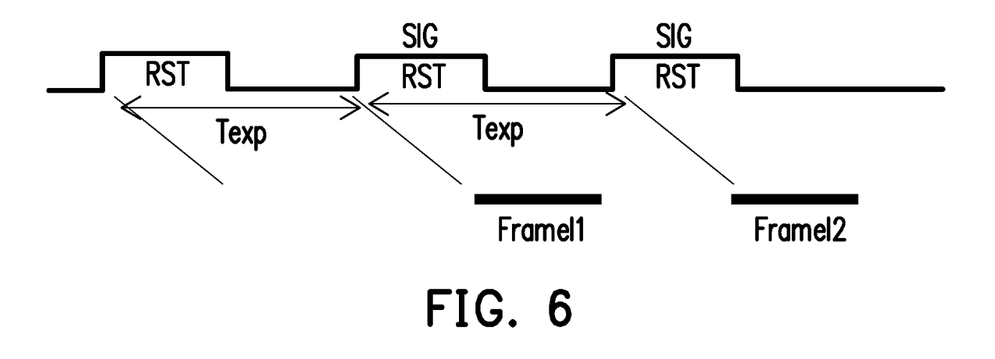
FIG. 6 is a schematic diagram illustrating capturing of 2 fingerprint images under different light frame luminances by the fingerprint sensing driving device according to an embodiment of the disclosure.

In order to perform the above calculation, the fingerprint sensing driving device 221 may capture the fingerprint images multiple times under different light frame luminances (or different ambient light luminances), and the processor 230 may then perform data image subtraction on these fingerprint images. FIG. 6 is a schematic diagram illustrating capturing of 2 fingerprint images Frame1 and Frame2 under different light frame luminances by the fingerprint sensing driving device 221 according to an embodiment of the disclosure. The horizontal axis shown in FIG. 6 represents time. Each RST shown in FIG. 6 represents a fingerprint frame reset operation. Each SIG shown in FIG. 6 represents a fingerprint frame reading operation. Each Texp shown in FIG. 6 represents exposure time of each scan line.

Based on a reset scanning timing, the fingerprint frame reset operation RST may be performed once in the touch region of the display panel 210. Regarding the same scan line, the time from the fingerprint frame reset operation RST to the fingerprint frame reading operation SIG is the exposure time Texp. After the exposure time Texp is over, based on a read scanning timing, the fingerprint sensing driving device 221 may perform the fingerprint frame reading operation SIG once to sense (read) a light sensing result (e.g., the fingerprint image Frame1) of the touch region of the display panel 210. Regarding each scan line of the display panel 210, after the fingerprint frame reading operation SIG is completed on the same scan line, the fingerprint frame reset operation RST may be performed again, and then after the exposure time Texp is over, the fingerprint frame reading operation SIG may be performed again to sense (read) another light sensing result (e.g., the fingerprint image Frame2) of the touch region of the display panel 210.

When the fingerprint image Frame1 is captured, the transmitted light intensity and/or the reflected light intensity of the finger may be different from the transmitted light intensity of the finger when the fingerprint image Frame2 is captured. For instance, the fingerprint sensing driving device 221 may capture the fingerprint image Frame1 of the finger when the frame displayed by the display panel 210 is of a first luminance, and the fingerprint sensing driving device 221 may then capture the fingerprint image Frame2 of the finger when the frame displayed by the display panel 210 is of a second luminance (lower than the first luminance). Alternatively, in some other embodiments, the fingerprint sensing driving device 221 may capture the fingerprint image Frame1 of the finger when the frame displayed by the display panel 210 is of the second luminance, and the fingerprint sensing driving device 221 may then capture the fingerprint image Frame2 of the finger when the frame displayed by the display panel 210 is of the first luminance (higher than the second luminance). The first luminance and the second luminance may be determined according to design needs. For instance, the first luminance may be a maximum luminance or a specific predetermined luminance of the display panel 210, and the second luminance may be 0.

When a fingerprint image is captured, the frame displayed by the display panel 210 may supply a light source (incident light) to the finger of the user. According to actual design, the frame displayed by the display panel 210 may be a single-tone full-frame image or may include any geometric shape to act as a speckle. The display driving device 222 may adjust data of the displayed frame or adjust a luminance of backlight to adjust the luminance of the frame (e.g., the speckle) displayed by the display panel 210. For instance, the fingerprint sensing driving device 221 may capture the fingerprint image Frame1 of the finger when the luminance of the speckle is "bright", and the fingerprint sensing driving device 221 may then capture the fingerprint image Frame2 of the finger when the luminance of the speckle is "dark".

Figure 7:
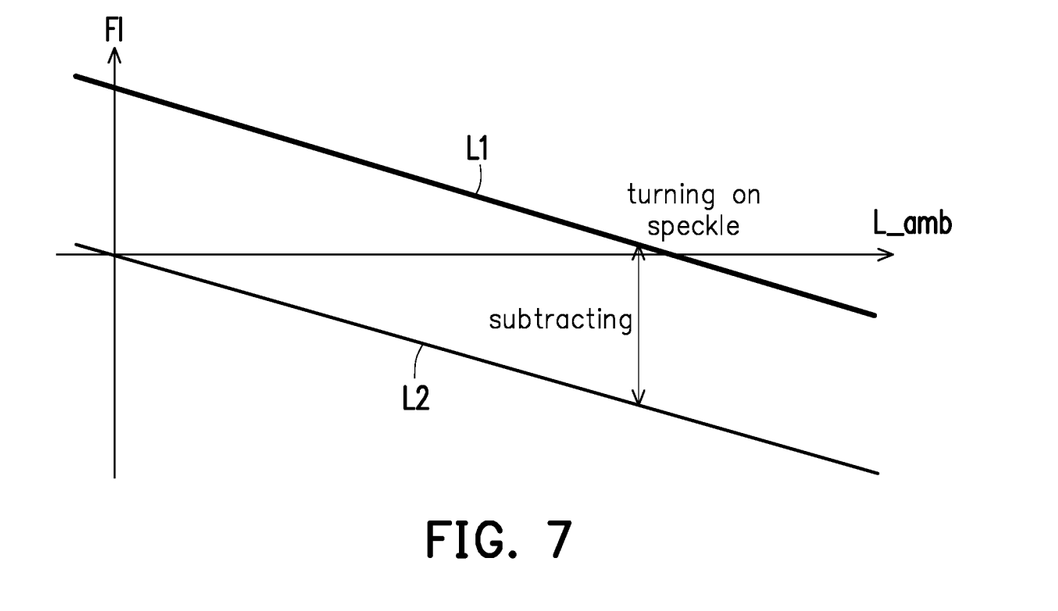
FIG. 7 is a schematic curve graph illustrating relationships between a luminance of ambient light and a sensing result of the fingerprint sensing driving device according to an embodiment of the disclosure.

FIG. 7 is a schematic curve graph illustrating relationships between a luminance of ambient light and a sensing result of the fingerprint sensing driving device 221 according to an embodiment of the disclosure. The horizontal axis shown in FIG. 7 represents a luminance (intensity) L_amb of the ambient light, or a luminance of the transmissive light component −RV2 generated by the ambient light penetrating the finger. The vertical axis shown in FIG. 7 represents a sensing result FI of the fingerprint sensing driving device 221. In strong ambient light, two different fingerprint images Frame1 and Frame2 are obtained by adjusting the luminance of the frame (e.g., speckle) displayed on the display panel 210. Description of the fingerprint image Frame1 captured in strong ambient light may be found with reference to the description related to the fingerprint image B of formula 2, and description of the fingerprint image Frame2 captured in strong ambient light may be found with reference to the description related to the fingerprint image C of formula 3. FIG. 7 shows a relationship curve L1 of the captured fingerprint image Frame1 when the luminance of the speckle is "bright" and a relationship curve L2 of the captured fingerprint image Frame2 when the luminance of the speckle is "dark".

After the fingerprint image Frame1 and the fingerprint image Frame2 are obtained, the processor 230 may subtract the fingerprint image Frame2 from the fingerprint image Frame1 to generate a processed fingerprint image, so that the negative effect of the ambient light on the processed fingerprint image may be lowered. The optical fingerprint sensing device 200 may use the processed fingerprint image to perform fingerprint recognition.

When the finger contacts the display panel 210, the display panel 210 may display the frame (e.g., the speckle) to act as the light source for capturing a fingerprint image. In strong ambient light, as the intensity of the speckle is limited, the reflected light component RV may not be greater than the transmissive light component −RV2. If turning off the speckle is still not enough, a shape of the speckle may be changed to enhance the intensity of the incident light.

For instance, in some embodiments, the fingerprint sensing driving device 221 may perform optical fingerprint sensing on the finger through the display panel 210 to obtain the fingerprint image Frame1. The fingerprint sensing driving device 221 may transmit the fingerprint image Frame1 back to the processor 230. The processor 230 may perform an image analysis on the fingerprint image Frame1 to recognize a plurality of feature points in the fingerprint image Frame1. According to the number of feature points or the resolution of the fingerprint image Frame1, the processor 230 may adjust the display parameters (e.g., the shape, luminance, color, or other display parameters of the speckle) of the image frame, or even turns off the speckle (not adding the speckle pattern to the image frame). The adjusted image frame may be displayed on the display panel 210 again. Based on the adjusted image frame, the fingerprint sensing driving device 221 may perform optical fingerprint sensing on the finger through the display panel 210 again to obtain another fingerprint image Frame2. The processor 230 may obtain the fingerprint image Frame2, and performs image operations on the fingerprint image Frame1 and the fingerprint image Frame2 to generate the processed fingerprint image. The processor 230 may obtain the processed fingerprint image from which the effect of the ambient light is eliminated according to the fingerprint image Frame1 and the fingerprint image Frame2. The processor 230 may use this processed fingerprint image to perform fingerprint recognition.

In view of the above, the different frames displayed by the display panel 210 include a first frame with a first speckle and a second frame with a second speckle. Corresponding to the first frame and the second frame, the different fingerprint images captured by the fingerprint sensing driving device 221 include a first fingerprint image and a second fingerprint image. In other words, the fingerprint sensing driving device 221 may drive the display panel 210 to capture the first fingerprint image of the finger when the first speckle is of the first luminance, and the fingerprint sensing driving device 221 may drive the display panel 210 to capture the second fingerprint image of the finger when the second speckle is of the second luminance (lower than the first luminance). For instance (but not limited thereto), the second luminance may be 0. The processor 230 may subtract the first fingerprint image from the second fingerprint image to generate the processed fingerprint image to lower the transmissive light component of the processed fingerprint image.

Figure 8:
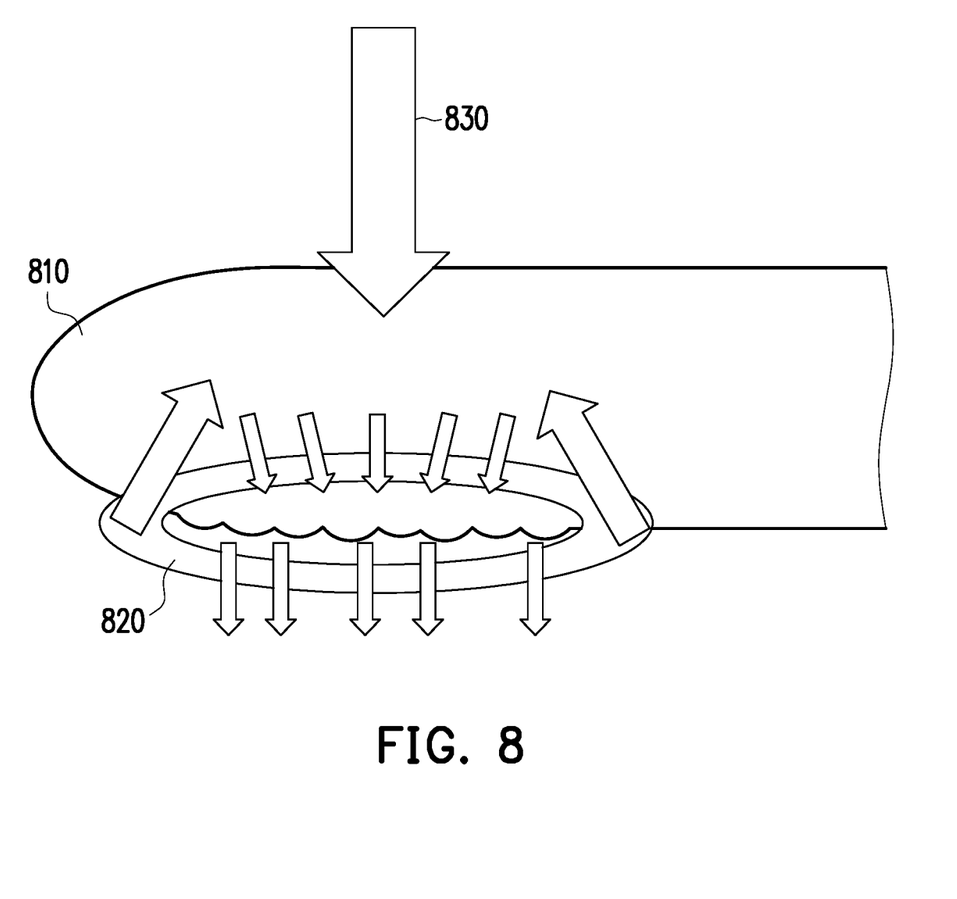
FIG. 8 is a schematic diagram illustrating a frame displayed by the display panel according to an embodiment of the disclosure.

FIG. 8 is a schematic diagram illustrating a frame displayed by the display panel 210 according to an embodiment of the disclosure. When a finger 810 contacts the display panel 210, the display panel 210 may display a ring-shaped speckle 820 in the touch region as shown in FIG. 8. The ring-shaped speckle 820 surrounds the touch region of the finger 810, that is, the fingerprint sensing region is located inside the ring-shaped speckle 820. When a fingerprint image is captured, the ring-shaped speckle 820 displayed by the display panel 210 may supply a light source (incident light) to the finger 810 of the user. In strong ambient light 830, as shown in FIG. 8, when the finger 810 contacts the touch region of the display panel 210, the light of the ring-shaped speckle 820 may penetrate the finger 810 from the side of the finger 810. The finger 810 itself may be used as a light guide path, so that the light of the ring-shaped speckle 820 may be guided to the touch region (or the fingerprint sensing region). Therefore, the light of the ring-shaped speckle 820 may enhance the transmissive light component −RV2 (the transmissive light component −RV2 herein is contributed by the ambient light 830 and the ring-shaped speckle 820).

In other words, in the embodiment shown in FIG. 8, the frame displayed by the display panel 210 includes a first region (e.g., a central region of the ring-shaped speckle 820) and a second region (e.g., the ring-shaped speckle 820, that is, a peripheral ring-shaped region of the first region). Any one of the fingerprint images captured by the fingerprint sensing driving device 221 includes the reflected light component and the first transmissive light component contributed by the first region and the second region of one of the different frames displayed by the display panel 210 and the second transmissive light component contributed by the ambient light. The different frames displayed by the display panel 210 are used to generate different intensities of the reflected light component and the different intensities of the first transmissive light component in each one of the different fingerprint images.

For instance, in the embodiment shown in FIG. 8, the different frames displayed by the display panel 210 include the first frame with the first speckle and the second frame with the second speckle. Corresponding to the first frame and the second frame, the different fingerprint images captured by the fingerprint sensing driving device 221 include the first fingerprint image and the second fingerprint image. The first speckle and the second speckle may be ring-shaped speckles 820 with different luminances (or colors). In the case that the first region (e.g., the central region of the ring-shaped speckle 820) of the first speckle is of the first luminance and the second region (e.g., the ring-shaped speckle 820, that is the peripheral ring-shaped region of the first region) of the first speckle is of the second luminance, the fingerprint sensing driving device 221 drives the display panel 210 to capture the first fingerprint image of the finger. In the case that the first region (e.g., the central region of the ring-shaped speckle 820) of the second speckle is of a third luminance and the second region (e.g., the ring-shaped speckle 820, that is the peripheral ring-shaped region of the first region) of the second speckle is of a fourth luminance (higher than the second luminance), the fingerprint sensing driving device 221 drives the display panel 210 to capture the second fingerprint image of the finger. For instance (but not limited thereto), the third luminance may be 0. The processor 230 may subtract the first fingerprint image from the second fingerprint image to generate the processed fingerprint image to lower the transmissive light component of the processed fingerprint image.

In view of the foregoing, in the embodiments, the fingerprint sensing driving device 221 may capture a plurality of different fingerprint images of the same finger under the different transmitted light intensities and/or the different reflected light intensities. The processor 230 may process the different fingerprint images provided by the fingerprint sensing driving device 221 to generate one processed fingerprint image to lower the negative effect of ambient light on fingerprint sensing. Therefore, in strong ambient light, the processor 230 may correctly perform fingerprint recognition.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A driver apparatus, comprising:
a display driving device, coupled to a display panel to drive the display panel to display different frames with different luminances, wherein the different frames are used to generate at least one of different transmitted light intensities and different reflected light intensities, wherein each of the different frames includes a speckle pattern, and an intensity of a light beam emitted from the display panel to a finger is enhanced by changing a shape of the speckle pattern when strong ambient light is detected; and
a fingerprint sensing driving device, configured to be coupled to the display panel to drive the display panel to perform a fingerprint capturing operation to capture a plurality of different fingerprint images of the finger under the at least one of the different transmitted light intensities and the different reflected light intensities, wherein the different fingerprint images are processed to generate a processed fingerprint image,
wherein any one of the plurality of different fingerprint images comprises:
a reflected light component contributed by a first region of the speckle pattern;
a first transmissive light component contributed by a second region of the speckle pattern, wherein light emitted from the second region of the speckle pattern penetrates through the finger, and the second region of the speckle pattern is located outside the first region of the speckle pattern; and
a second transmissive light component contributed by ambient light which penetrates through the finger.

2. The driver apparatus according to claim 1, wherein the different fingerprint images are processed to lower a negative effect of ambient light on the processed finger print image.

3. The driver apparatus according to claim 1, wherein the fingerprint sensing driving device transmits the different fingerprint images to a processor, and the processor processes the different fingerprint images to generate the processed fingerprint image.

4. The driver apparatus according to claim 3, wherein the display driving device is controlled by the processor to generate the different frames.

5. The driver apparatus according to claim 1, wherein the different frames have at least one of characteristics comprising shape, area, global luminance, local luminance, and quantity, to produce the at least one of the different transmitted light intensities and the different reflected light intensities.

6. The driver apparatus according to claim 1, wherein any one of the different fingerprint images comprises a reflected light component contributed by the different frames and a transmissive light component contributed by ambient light.

7. The driver apparatus according to claim 6, wherein the different frames are used to generate different intensities of the reflected light component of the different fingerprint images.

8. The driver apparatus according to claim 6, wherein the different frames comprise a first frame with a first speckle and a second frame with a second speckle, the different fingerprint images comprise a first fingerprint image and a second fingerprint image, the fingerprint sensing driving device drives the display panel to capture the first fingerprint image of the finger when the first speckle is of a first luminance, and the fingerprint sensing driving device drives the display panel to capture the second fingerprint image of the finger when the second speckle is of a second luminance lower than the first luminance.

9. The driver apparatus according to claim 8, wherein the first fingerprint image is subtracted from the second fingerprint image to generate the processed fingerprint image to lower the transmissive light component of the processed fingerprint image.

10. The driver apparatus according to claim 8, wherein the second luminance is 0.

11. The driver apparatus according to claim 1, wherein the different frames are used to generate different intensities of the reflected light component of the different fingerprint images and different intensities of the first transmissive light component of the different fingerprint images.

12. The driver apparatus according to claim 1, wherein the first region is a central region of the speckle pattern, and the second region is a peripheral ring-shaped region of the speckle pattern.

13. The driver apparatus according to claim 1, wherein the different frames comprises a first frame with a first speckle and a second frame with a second speckle, the different fingerprint images comprise a first fingerprint image and a second fingerprint image, the fingerprint sensing driving device drives the display panel to capture the first fingerprint image of the finger when a first region of the first speckle is of a first luminance and a second region of the first speckle is of a second luminance, the fingerprint sensing driving device drives the display panel to capture the second fingerprint image of the finger when a first region of the second speckle is of a third luminance lower than the first luminance and a second region of the second speckle is of a fourth luminance higher than the second luminance.

14. The driver apparatus according to claim 13, wherein the first fingerprint image is subtracted from the second fingerprint image to generate the processed fingerprint image.

15. The driver apparatus according to claim 13, wherein the third luminance is 0.

16. An optical fingerprint sensing apparatus, comprising:
a display panel, performing a fingerprint capturing operation on a finger when the finger contacts the display panel; and
a driver apparatus suitable for driving the display panel, comprising:
a display driving device, coupled to the display panel to drive the display panel to display different frames with different luminances, wherein the different frames are used to generate at least one of different transmitted light intensities and different reflected light intensities, wherein each of the different frames includes a speckle pattern, and an intensity of a light beam emitted from the display panel to a finger is enhanced by changing a shape of the speckle pattern when strong ambient light is detected; and
a fingerprint sensing driving device, configured to be coupled to the display panel to drive the display panel to perform the fingerprint capturing operation to capture a plurality of different fingerprint images of the finger under the at least one of the different transmitted light intensities and the different reflected light intensities, wherein the different fingerprint images are processed to generate a processed fingerprint image,
wherein any one of the plurality of different fingerprint images comprises:
a reflected light component contributed by a first region of the speckle pattern;
a first transmissive light component contributed by a second region of the speckle pattern, wherein light emitted from the second region of the speckle pattern penetrates through the finger, and the second region of the speckle pattern is located outside the first region of the speckle pattern; and
a second transmissive light component contributed by ambient light which penetrates through the finger.

17. An operation method of a driver apparatus suitable for driving a display panel, the operation method comprising:
driving the display panel to display different frames when a finger contacts the display panel, wherein the different frames are used to generate at least one of different transmitted light intensities and different reflected light intensities, wherein each of the different frames includes a speckle pattern, and an intensity of a light beam emitted from the display panel to a finger is enhanced by changing a shape of the speckle pattern when strong ambient light is detected; and
driving the display panel to perform the fingerprint capturing operation to capture a plurality of different fingerprint images of the finger under the at least one of the different transmitted light intensities and the different reflected light intensities, wherein the different fingerprint images are processed to generate a processed fingerprint image,
wherein any one of the plurality of different fingerprint images comprises:

a reflected light component contributed by a first region of the speckle pattern;

a first transmissive light component contributed by a second region of the speckle pattern, wherein light emitted from the second region of the speckle pattern penetrates through the finger, and the second region of the speckle pattern is located outside the first region of the speckle pattern; and a second transmissive light component contributed by ambient light which penetrates through the finger.

18. The operation method according to claim 17, further comprising:

processing the different fingerprint images to lower a negative effect of ambient light on the processed finger print image.

19. The operation method according to claim 17, further comprising:

transmitting the different fingerprint images to a processor; and processing the different fingerprint images by the processor to generate the processed fingerprint image.

20. The operation method according to claim 19, further comprising:

controlling, by the processor, the display driving device to generate the different frames.

21. The operation method according to claim 17, wherein the different frames have at least one of characteristics comprising shape, area, global luminance, local luminance, and quantity, to produce the at least one of the different transmitted light intensities and the different reflected light intensities.

22. The operation method according to claim 17, wherein any one of the different fingerprint images comprises a reflected light component contributed by the different frames and a transmissive light component contributed by ambient light.

23. The operation method according to claim 22, wherein the different frames are used to generate different intensities of the reflected light component of the different fingerprint images.

24. The operation method according to claim 22, wherein the different frames comprise a first frame with a first speckle and a second frame with a second speckle, the different fingerprint images comprise a first fingerprint image and a second fingerprint image, and the operation method further comprises:

driving the display panel to capture the first fingerprint image of the finger when the first speckle is of a first luminance by the fingerprint sensing driving device; and driving the display panel to capture the second fingerprint image of the finger when the second speckle is of a second luminance lower than the first luminance.

25. The operation method according to claim 24, further comprising:

generating the processed fingerprint image to lower the transmissive light component of the processed fingerprint image through subtracting the first fingerprint image from the second fingerprint image.

26. The operation method according to claim 24, wherein the second luminance is 0.

27. The operation method according to claim 17, wherein the different frames are used to generate different intensities of the reflected light component of the different fingerprint images and different intensities of the first transmissive light component of the different fingerprint images.

28. The operation method according to claim 17 wherein the first region is a central region of the speckle pattern, and the second region is a peripheral ring-shaped region of the speckle pattern.

29. The operation method according to claim 17, wherein the different frames comprise a first frame with a first speckle and a second frame with a second speckle, the different fingerprint images comprise a first fingerprint image and a second fingerprint image, and the operation method further comprises:

driving the display panel to capture the first fingerprint image of the finger when a first region of the first speckle is of a first luminance and a second region of the first speckle is of a second luminance;

driving the display panel to capture the second fingerprint image of the finger when a first region of the second speckle is of a third luminance lower than the first luminance and a second region of the second speckle is of a fourth luminance higher than the second luminance.

30. The operation method according to claim 29, further comprising:

generating the processed fingerprint image through subtracting the first fingerprint image from the second fingerprint image.

31. The operation method according to claim 29, wherein the third luminance is 0.

* * * * *